United States Patent
Kikuchi et al.

(10) Patent No.: US 6,285,362 B1
(45) Date of Patent: Sep. 4, 2001

(54) COMMUNICATION TERMINAL AND ITS DISPLAY CONTROL SYSTEM

(75) Inventors: Misao Kikuchi; Yasushi Kitagawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/410,071

(22) Filed: Oct. 1, 1999

Related U.S. Application Data (62) Division of application No. 08/636,803, filed on Apr. 23, 1996, now Pat. No. 6,054,982.

(30) Foreign Application Priority Data

Oct. 27, 1995 (JP) .................................................. 7-281016

(51) Int. Cl.[7] ....................................................... G09G 5/00
(52) U.S. Cl. ............................ 345/329; 345/335; 709/217
(58) Field of Search ..................................... 345/327, 333, 345/334, 335, 356, 330, 161, 162, 168, 328, 329, 355, 346; 709/202, 223, 224, 217

(56) References Cited

U.S. PATENT DOCUMENTS

| | | | |
|---|---|---|---|
| 5,198,802 | * 3/1993 | Bertram et al. | 345/168 |
| 5,241,303 | * 8/1993 | Regrister et al. | 345/168 |
| 5,459,832 | 10/1995 | Wolf et al. . | |
| 5,486,846 | * 1/1996 | Comer et al. | 345/168 |
| 5,491,743 | 2/1996 | Shiio et al. . | |
| 5,524,194 | * 6/1996 | Chida et al. | 345/333 |
| 5,544,300 | 8/1996 | Skarbo et al. . | |
| 5,634,018 | 5/1997 | Taniicoshi et al. . | |
| 5,719,637 | 2/1998 | Ohkurd et al. . | |
| 5,742,762 | * 4/1998 | Scholl et al. | 709/224 |
| 5,818,541 | 10/1998 | Matsoora et al. . | |
| 5,892,905 | * 4/1999 | Brandt | 709/202 |
| 5,923,306 | * 7/1999 | Smith et al. | 345/2 |
| 5,935,004 | * 8/1999 | Tarr et al. | 463/40 |
| 5,959,596 | * 9/1999 | McCarten et al. | 345/2 |
| 6,029,046 | * 2/2000 | Khan et al. | 725/31 |
| 6,135,881 | * 10/2000 | Abbott et al. | 463/3 |

\* cited by examiner

Primary Examiner—Raymond J. Bayerl
Assistant Examiner—Cao K. Nguyen
(74) Attorney, Agent, or Firm—Staas & Halsey LLP

(57) ABSTRACT

A communication terminal receives character-based information from a host machine via a communication line. The terminal includes a menu identifying section for identifying menu information from a menu picture received from the host machine, and a menu information storing section for extracting individual informations from the menu information identified by the menu identifying section. The individual informations are selectable using input admissible commands, respectively, and the menu information storing section temporarily stores the individual informations and the corresponding input admissible commands. The terminal further includes a display output control section for outputting at least the individual informations in a manner to match a display fashion of a display unit, and a selecting section for selecting one of the individual informations displayed on the display unit by the display output control section. The terminal further includes a command transmission control section for reading out the command, which corresponds to the individual information selected by the selecting section, from the menu information storing section. The command transmission control section transmits the read-out command to the host machine.

9 Claims, 8 Drawing Sheets

```
NIFTY-Serve      TOP
 1. サービス案内・検索      2. 電子メール
 3. 掲示板                 4. CBシミュレーター
 5. フォーラム／ステーション  6. ニュース／スポーツ／天気予報
 7. 企業／経済／人物／行政   8. 科学／技術／翻訳
 9. 語学／教育／就職       10. 趣味／旅行／生活／ボランティア
11. 占い／クイズ／ゲーム    12. ワープロ／コンピューター
13. ショッピング           14. 滴外データベース(INFOCUE)
15. コンピュサーブコーナー  16. ビギナーズコーナー
17. 他ネット接続サービス     E. 終了
>2
```

FIG. 3

| COMMAND | MENU INDIVIDUAL INFORMATION |
|---|---|
| 1 | SERVICE GUIDE • SEARCH |
| 2 | ELECTRONIC MAIL |
| 3 | BILLBOARD |
| 4 | CB SIMULATOR |
| ⋮ | ⋮ |
| 17 | OTHER NETWORK CONNECTION SERVICE |
| E | END |

FIG. 4

```
 1:
 2:    NIFTY-Serve》》》》TOP
 3:    》1.》サービス案内・検索》》》》》》》》》》》2.》電子メール
 4:    》3.》掲示板》》》》》》》》》》》》》》》》4.》CB-シミュレーター
 5:    》5.》フォーラム》》》》》》》》》》》》》6.》ニュース／スポーツ／天気予報
 6:    》7.》企業／経済／人物／行政》》》》》》8.》科学／技術／翻訳
 7:    》9.》書籍／教育／就職》》》》》》》》10.》趣味／旅行／生活
 8:    11.》占い／クイズ／ゲーム》》》》》》》12.》ワープロ／コンピューター
 9:    13.》ショッピング／ステーション》》》》14.》海外データベース(INFOCUE)
10:    15.》コンピュサーブコーナー》》》》》》》16.》ビギナーズコーナー
11:    17.》他ネット接続サービス》》》》》》》》E.》終了．
12:    >7
```

FIG. 5

```
12345678911234567892123456793123456789412345679 5    (CHARACTER NUMBERS)
>1.》サービス案内・検索》》》》》》》》》》》2.》電子メール   (CHARACTER STRING)
```

| | | |
|---|---|---|
| か | ゛ | |
| き | ゛ | |
| く | ゛ | |
| け | ゛ | |
| こ | ゛ | |
| さ | ゛ | |
| し | ゛ | |
| す | ゛ | |
| せ | ゛ | |
| そ | ゛ | |
| た | ゛ | |
| ち | ゛ | |
| つ | ゛ | |
| て | ゛ | |
| と | ゛ | |
| は | ゛ | ゜ |
| ひ | ゛ | ゜ |
| ふ | ゛ | ゜ |
| へ | ゛ | ゜ |
| ほ | ゛ | ゜ |

COMMUNICATION TERMINAL AND ITS DISPLAY CONTROL SYSTEM

This application is a divisional of application Ser. No. 08/636,803, filed Apr. 23, 1996, U.S. Pat. No. 6,054,982.

BACKGROUND OF THE INVENTION

1. Field of the Invention

The present invention relates to a character-based communication offering system.

2. Description of the Prior Art

With the recent rapid spread of personal computer communications, the mode of communications and businesses have been changing through, such information exchanges as electronic mails and forums. On the other hand, communication medium using graphical user interfaces (GUI), for example, the Internet, have been proposed. However, it is not easy to set up a terminal for using the Internet as compared with using a personal computer for communication. Accordingly, even if a user acquires an account under a certain provider and tries a dial-up connection, it is fairly difficult for the user having no knowledge about the work station to set up the terminal and achieve a connection to the Internet successfully.

On the other hand, the personal computer communication services have a history of more than 10 years to date, so that the operation has been standardized, with the set-up of the interface at the communication terminal side being not so difficult. Thus, personal computer communication services are expected to be spread more and more in future if interconnection with the Internet or the like is made possible.

Of the services offered by the major personal computer communication companies, the character-based services have been dominant. Thus, the users' terminals have also been mainly those devices, such as personal computers or word processors, which are capable of. Accordingly, the user needs to input certain character strings or commands using a keyboard, such as for editing electronic mail in a communication-mode picture on a display screen. For this reason, people, particularly children or the aged, who are not familiar with using keyboards, tend to stay away from personal computer communication services. Accordingly, while having an interest in personal computer communication, they have not been utilizing their personal computer for communication, but for playing video games.

SUMMARY OF THE INVENTION

The present invention has been made in view of the foregoing and has an object to make it possible to access the existent personal computer communication services using a video game unit as a terminal, wherein the trouble of command inputting is reduced and a display is matched with a normal television screen.

According to a first aspect of the present invention, a communication terminal for receiving character-based information from a host machine via a communication line, comprises menu identifying means for identifying menu information from a menu picture received from the host machine; menu information storing means for extracting individual informations from the menu information identified by the menu identifying means, the individual informations being selectable using input admissible commands, respectively, and for temporarily storing the individual informations and the corresponding input admissible commands; display output control means for outputting at least the individual informations in a manner to match a display fashion of a display unit; selecting means for selecting one of the individual informations displayed on the display unit by the display output control means; and command transmission control means for reading out the command, which corresponds to the individual information selected by the selecting means, from the menu information storing means and for transmitting it to the host machine.

According to a second aspect of the present invention, in the first aspect of the present invention, the menu identifying means detects given character strings from character information forming the menu picture so as to extract the input admissible commands and the individual informations.

According to the first and second aspects of the present invention, the following advantage is achieved:

In the personal computer communication service taking into account the console of the personal computer, for example, a maximum length of the character displaying is set to 80 bytes, and menu display includes two or three individual menu items within 80 bytes for efficient displaying. Accordingly, if the individual menu can be extracted from such a menu picture, the menu can be displayed in a rearranged fashion on a television screen having a limited display capability. Further, when extracting the information from the menu, the corresponding commands can be stored in the menu information storing means so that the command corresponding to the individual information selected by the selecting means can be outputted to the host machine.

With this arrangement, the menu can be rearranged and displayed on the television screen without being effected by the menu structure sent from the host machine.

According to a third aspect of the present invention, a display control system of a communication terminal for receiving character-based information from a host machine via a communication line, comprises a display unit for displaying a communication picture; operating means for changing the communication picture based on an external operation; picture storing means for storing no less than two communication pictures; and display control means for changing a picture state of the display unit by an input from the operating means, wherein the display control means displays one of the communication pictures, stored in the picture storing means, on a maximum scale on the display unit as a main picture to which a command input is admissible, wherein the display control means displays another stored communication picture as a sub-picture along with the main picture, and wherein the display control means switches between the main picture and the sub-picture based on the operation of the operating means.

According to a fourth aspect of the present invention, in the third aspect of the present invention, the display control means, upon switching the sub-picture to the main picture, dynamically changes the sub-picture as a starting picture to the main picture as a final picture.

According to a fifth aspect of the present invention, in the fourth aspect of the present invention, the dynamic change is a change in which the sub-picture arranged at a distance on the display unit in a pseudo manner approaches closer.

According to the third to fifth aspects of the present invention, the switching of pictures can be easily achieved even during personal computer communication operated on the character basis. Accordingly, for example, since the communication picture and the transmission mail editing picture can be switched in turn, the smooth picture switching can be achieved even using a video game terminal.

According to a sixth aspect of the present invention, a display control system of a communication terminal for receiving character-based information from a host machine via a communication line, comprises a display unit for displaying a communication picture; and display control means for displaying a character on a background picture, wherein the display control means changes the background picture depending on a connected or disconnected state relative to the host machine.

According to the sixth aspect of the present invention, for example, by changing a background color depending on whether the communication terminal is set in an on-line state so as to load received mail or in an off-line state so as to edit transmission mail, the user can easily understands the current situation.

According to a seventh aspect of the present invention, a display control system of a communication terminal for receiving character-based information from a host machine via a communication line, comprises editing means for editing a document; a pseudo keyboard displaying means for displaying a software keyboard for performing a character input on the editing means, wherein the pseudo keyboard displaying means displays an admissible character display frame on the software keyboard, the admissible character display frame displaying admissible characters which are adapted to follow designated characters.

According to the seventh aspect of the present invention, the input on the software keyboard having a limited display frame can be achieved efficiently.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

Figure 1:
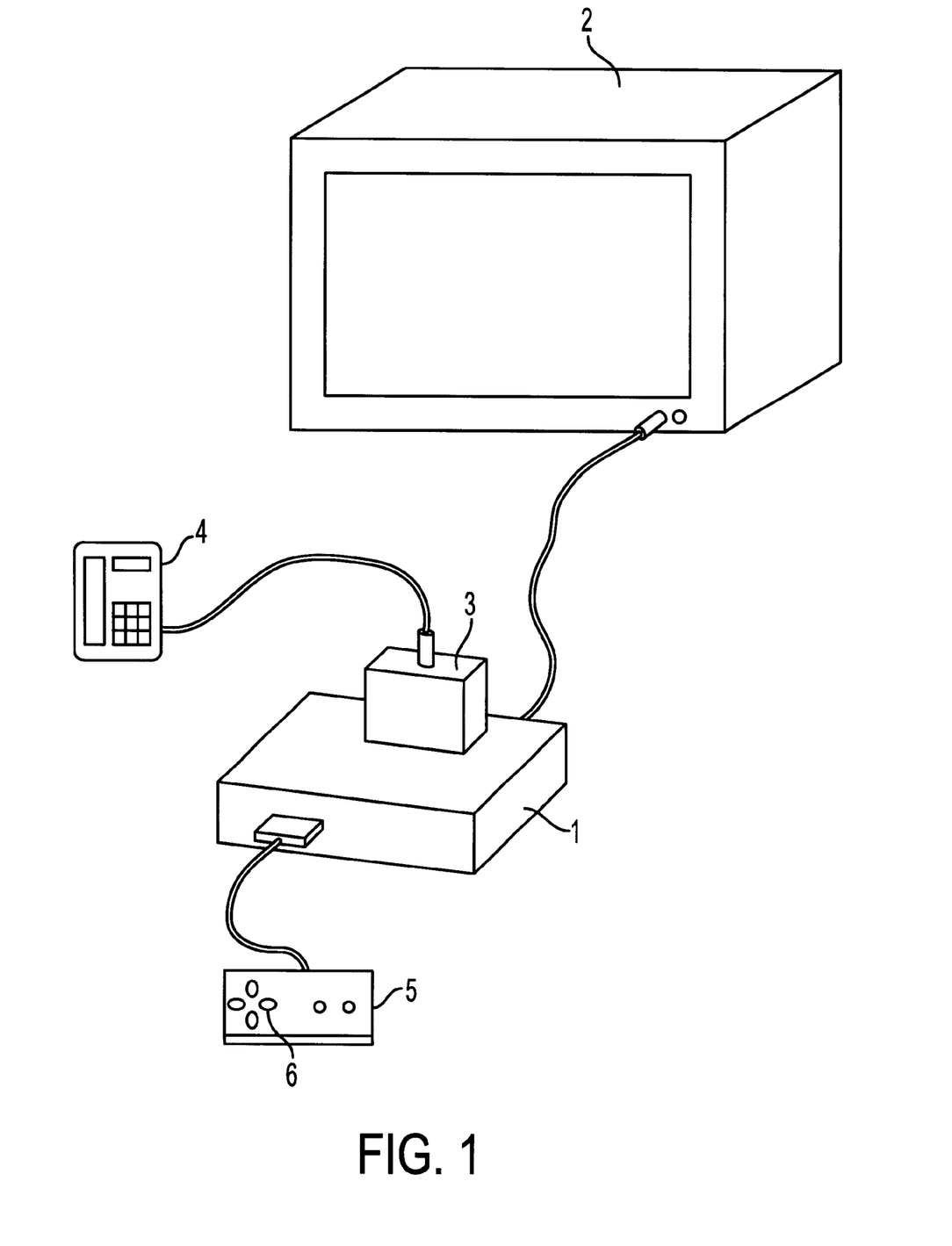
FIG. 1 is a diagram of a communication terminal according to a first preferred embodiment of the present invention.

FIG. 1 shows a communication terminal according to a first preferred embodiment of the present invention. In the figure, numeral 1 denotes a game unit body (communication terminal body) which is connected to a television receiver 2 as a CRT display.

The game unit body 1 includes therein a microprocessor (not shown), a memory (not shown) storing an initial program, and others which constitute a computer system. It is preferable that the microprocessor is capable of 16~64 bit processing.

A modem cartridge 3 is attached to the game unit body 1. The modem cartridge 3 is connected to a domestic telephone 4 via a modular cord. The modem cartridge 3 has a data transfer rate of 2,400~28,800 bps as a modulator and stores communication programs in a RAM or ROM incorporated therein.

A controller 5 is connected to the game unit body 1 and provided with a direction selector key 6. By operating the direction selector key 6, the user can move a cursor upward, downward, rightward and leftward on a display screen of the television receiver 2.

Figure 2:
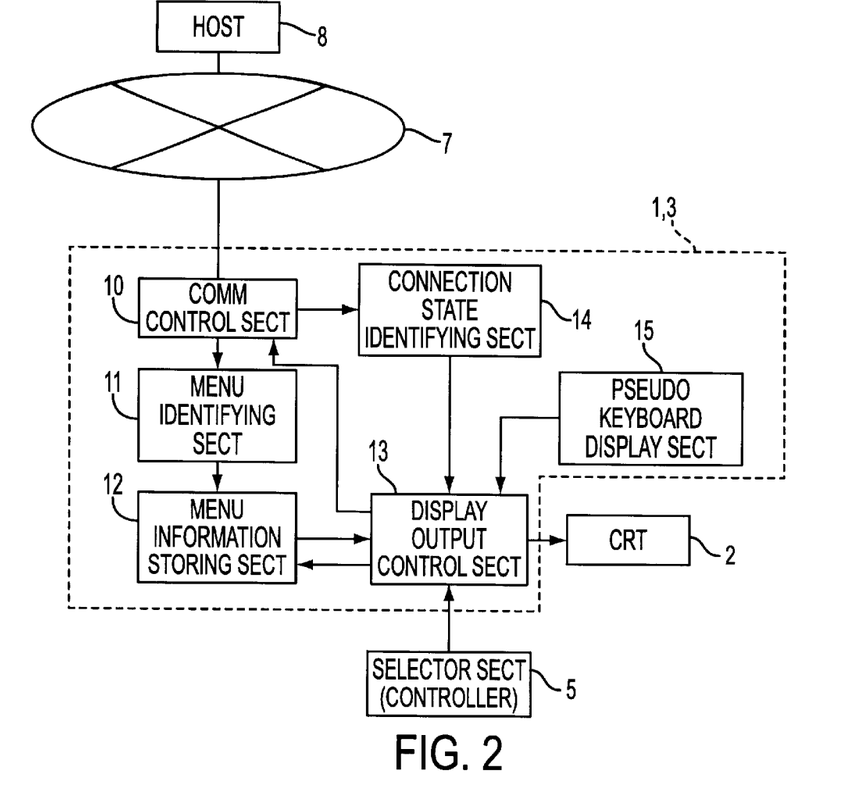
FIG. 2 is a functional block diagram of the communication terminal shown in FIG. 1 connected to a host machine via a communication network.

FIG. 2 is a functional block diagram of the communication system shown in FIG. 1 for explaining an operation thereof.

In the figure, a portion surrounded by a broken line is realized by the game unit body 1 and the modem cartridge 3 in FIG. 1.

The game unit body 1 is communicable with a host machine 8 via a communication network 7. A communication control section 10 works as a communication interface and converts character-based information sent from the host machine 8 into code information.

A menu identifying section 11 analyzes menu information sent from the host machine 8 and extracts individual menu elements (items or individual informations) therefrom. These menu information analyzing and individual information extracting processes will be described later in detail.

Figure 4:
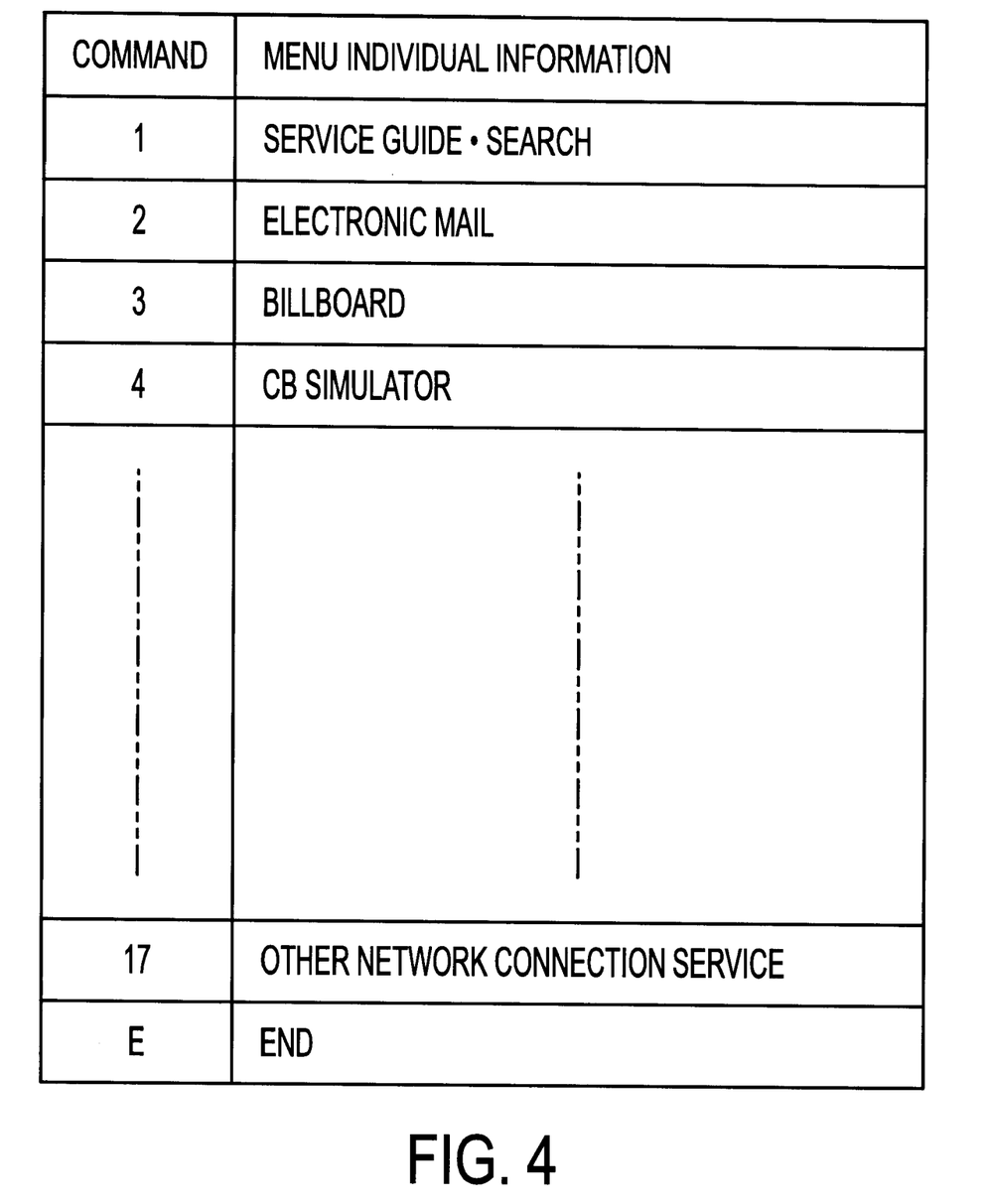
FIG. 4 is an explanatory diagram showing a table structure of a menu information storing section in the communication terminal shown in FIG. 2.

A menu information storing section 12 stores the menu individual information extracted at the menu identifying section 11 and commands corresponding to those individual informations of the menu, respectively, in a manner as shown in FIG. 4 showing a table structure of the menu information storing section 12.

A display output control section 13 rearranges the menu individual informations and displays them on the display screen of the CRT display (television receiver) 2. Further, the display output control section 13 transmits a command corresponding to one of the menu individual informations selected by the controller 5 on the display screen, to the host machine 8 via the communication control section 10.

Now, an operation of the menu identifying section 11 will be described hereinbelow.

Figure 3:
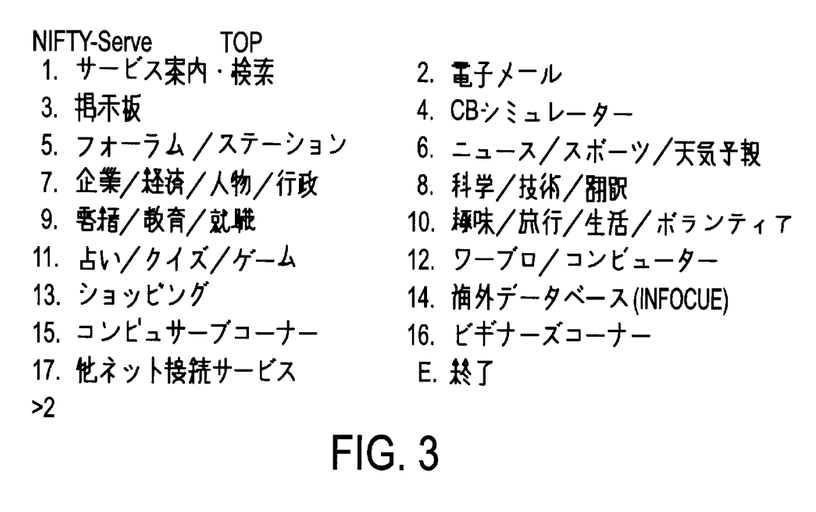
FIG. 3 is an explanatory diagram showing a menu picture used in one of the personal computer communication networks.

FIG. 3 shows a top menu picture of the NIFTY-Serve (personal computer communication network service based on joint investment from Nissho Iwai K. K. and Fujitsu K. K.), one of the major personal computer communication networks. As seen from the figure, since this network service is premised on access by the personal computer or the word processor, each line displays two menu items in the light of efficient use of a display screen thereof.

In FIG. 3, menu item 1 represents "service guide • search", menu item 2 "electronic mail", menu item 3 "billboard", menu item 4 "CB simulator", menu item 5 "forum/station", menu item 6 "news/sports/weather forecast", menu item 7 "enterprise/economy/person/ administration", menu item 8 "science/technology/ translation", menu item 9 "books/education/employment", menu item 10 "taste/travel/life/volunteer", menu item 11 "divination/quiz/game", menu item 12 "word processor/ computer", menu item 13 "shopping", menu item 14 "overseas data base (INFOCUE)", menu item 15 "compuserve corner", menu item 16 "beginner's corner", menu item 17 "other network connection service", and menu item E "END".

Figure 5:
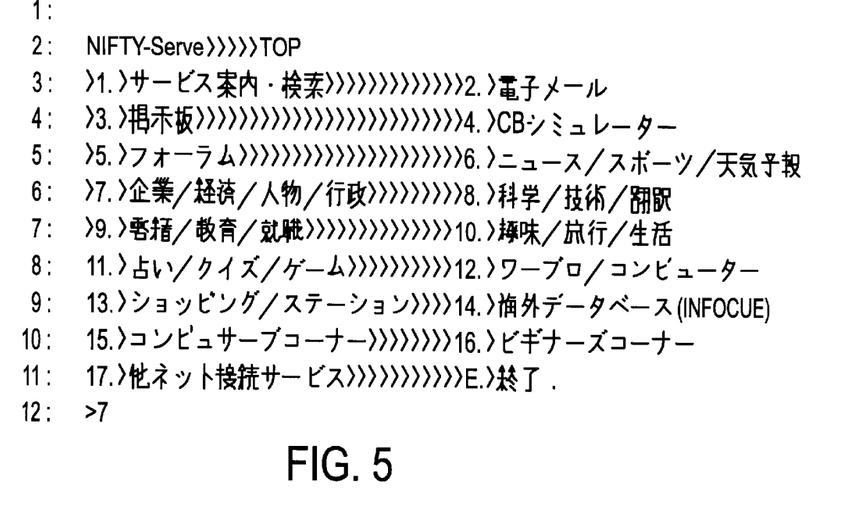
FIG. 5 is an explanatory diagram showing the menu picture in FIG. 3 with line numbers and with ">" which shows a half-size space.
Figure 6:
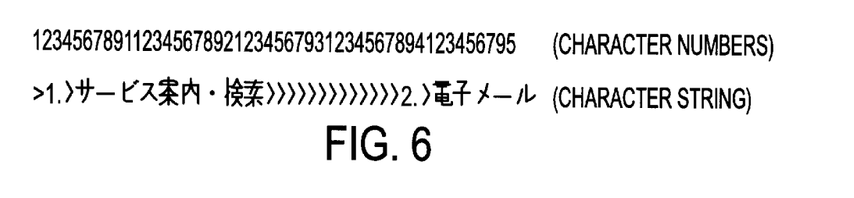
FIG. 6 is an explanatory diagram showing the third line in the Japanese equivalent of menu picture in FIG. 5 with character numbers.

For facilitating explanation, FIG. 5 shows the top menu picture in FIG. 3 with line numbers and with ">" which represents a half-size space as appreciated from FIG. 6.

In FIG. 5, the third line includes the menu items 1 and 2 and the fourth line includes the menu items 3 and 4, for example. Since, in this fashion, two menu items are included on each line, that is, from a carriage return code to the next carriage return code, it is necessary to identify these two menu items and extract them separately.

The menu item identifying and extracting processes achieved by the menu identifying section 11 will be described hereinbelow with reference to the third line in FIG. 5 and thus to FIG. 6.

On the third line, the 1st byte represents a space code ">", the 2nd byte represents "1", the 3rd byte represents ".", the 4th byte represents a space code ">", and the following bytes represent "service guide • search". After a series of space codes ">" follows a character string of "2", ".", ">" and "electronic mail" which represents the menu item 2.

In this preferred embodiment, upon identifying a character string "NIFTY-Serve>>>>>TOP", the menu identifying section 11 starts searching, using the next carriage return code "CR" as a starting point, a character code combination of "numerical code + ." formed by two bytes. In FIG. 5, "1." is first found on the third line. Thus, the menu identifying section 11 stores "1" as an input admissible command in the table (see FIG. 4) of the menu information storing section 12. Then, the menu identifying section 11 extracts a subsequent character string of menu item "service guide • search". As shown in FIG. 6, each character of the menu item "service guide • search" written in its Japanese equivalent, and is formed by two bytes, which also applies to the other menu items shown in FIG. 5. Upon extracting the menu item, when two or more space codes ">" (each formed by one byte) continue, the menu identifying section 11 stores the character string excluding those space codes ">" in the menu information storing section 12 as the individual information of the menu as shown in FIG. 4.

Subsequently, the menu identifying section 11 continues to scan the top menu picture until a numerical character code ("2" in FIGS. 5 and 6) appears after a series of the one-byte space codes ">". If a character code string of "2.>electronic mail" is detected, the menu identifying section 11, as in the foregoing manner, stores "2" as an input admissible command and "electronic mail" as an individual information of the menu in the table of the menu information storing section 12 as shown in FIG. 4.

By repeating the foregoing processes until a character string of "E.>END" appears, all the accessible commands "1~17" and all the corresponding menu individual informations "service guide • search~END" are extracted from the top menu picture.

The thus extracted individual informations of the menu are read out from the menu information storing section 12 and displayed on the CRT display 2 by means of the display output control section 13. In this case, the menu individual informations are displayed on the CRT display 2 in order of the menu item numbers "1~17" and alternatively selectable using the direction selector key 6 of the controller 5.

When the user selects one of the menu individual informations, such as "electronic mail", using the direction selector key 6, the display output control section 13 looks through the table of the menu information storing section 12 and sends a corresponding command ("2" in FIGS. 5 and 6) to the host machine 8 via the communication control section 10.

In response to this, the host machine 8 executes a process just like when "2" is inputted via the keyboard of the communication terminal in the normal personal computer communication, that is, executing a shift to a mode of "electronic mail".

In the foregoing description, only the individual information in the top menu picture received from the host machine 8 are stored in the menu information storing section 12. On the other hand, the user may store a user's designated menu as individual informations. For example, a particular forum may be stored so as to facilitate a shift to that forum.

As described above, in the first preferred embodiment, the menu information is analyzed to extract the individual informations of the menu so that the menu picture of the personal computer communication is rearranged to be displayed on the normal television receiver 2 having the limited display screen. Further, the user can easily achieve selection of the menu and execution of the selected individual menu without thinking about the bothersome commands.

Second Embodiment

Figure 7:
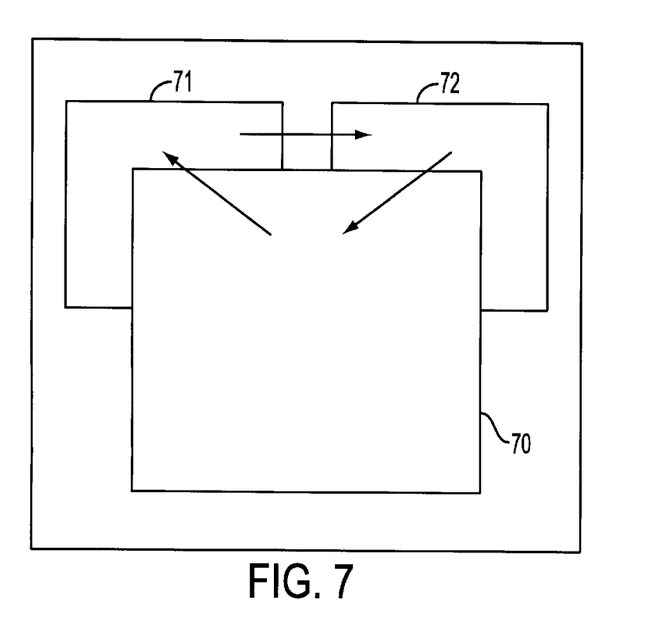
FIG. 7 is an explanatory diagram showing a relationship among a main picture, a first sub-picture and a second sub-picture according to a second preferred embodiment of the present invention.
Figure 8:
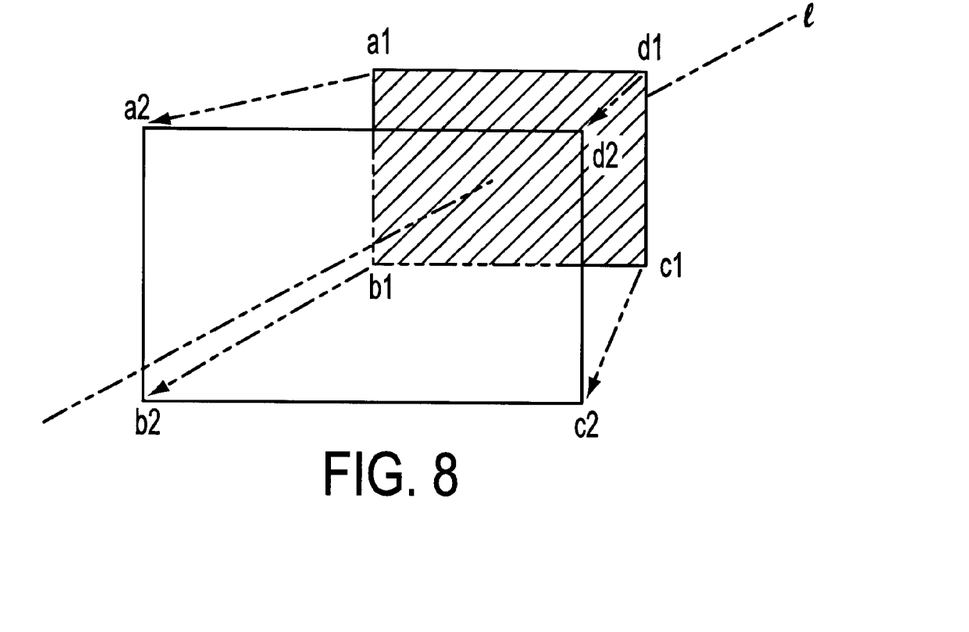
FIG. 8 is an explanatory diagram showing a relationship between the second sub-picture and the main picture.

FIGS. 7 and 8 are explanatory diagrams showing a second preferred embodiment of the present invention. FIGS. 1 and 2 also apply to the second preferred embodiment.

On the CRT display 2, a main picture 70, a first sub-picture 71 and a second sub-picture 72 are displayed. For example, in FIG. 7, the main picture 70 may be a terminal picture of the communication showing the current communication state, the first sub-picture 71 may be a menu originally set by the user, and the second sub-picture 72 may be a top menu.

These main picture 70 and the first and second sub-pictures 71 and 72 are stored in the menu information storing section 12.

In this preferred embodiment, switching among the pictures can be achieved by operating the controller 5. Specifically, by operating the controller 5, the display on the CRT display 2 changes in the order like "main picture"→"first sub-picture"→"second sub-picture"→"main picture" as appreciated from FIG. 7. When the second sub-picture 72 changes to the main picture 70, the second sub-picture 72 located on the upper-right is gradually enlarged as moving forward, from afar, to the center so as to become the main picture 70. This is shown in FIG. 8. As seen in this figure, with respect to an axis 1 extending slantly forward from upper-right to lower-left, the picture is gradually magnified in a diffused manner based on an enlarging positional calculation like a1→a2, b1→b2, c1→c2 and d1→d2.

As appreciated, when the main picture 70 changes to the first sub-picture 71, the picture is gradually diminished as moving backward, that is, in a reversed manner as compared with the case where the second sub-picture 72 changes to the main picture 70.

It may be arranged that the display output control section 13 automatically switches between the main picture and the first or second sub-picture depending on an on-line or off-line state of the communication terminal relative to the host machine 8.

Third Embodiment

Figure 9:
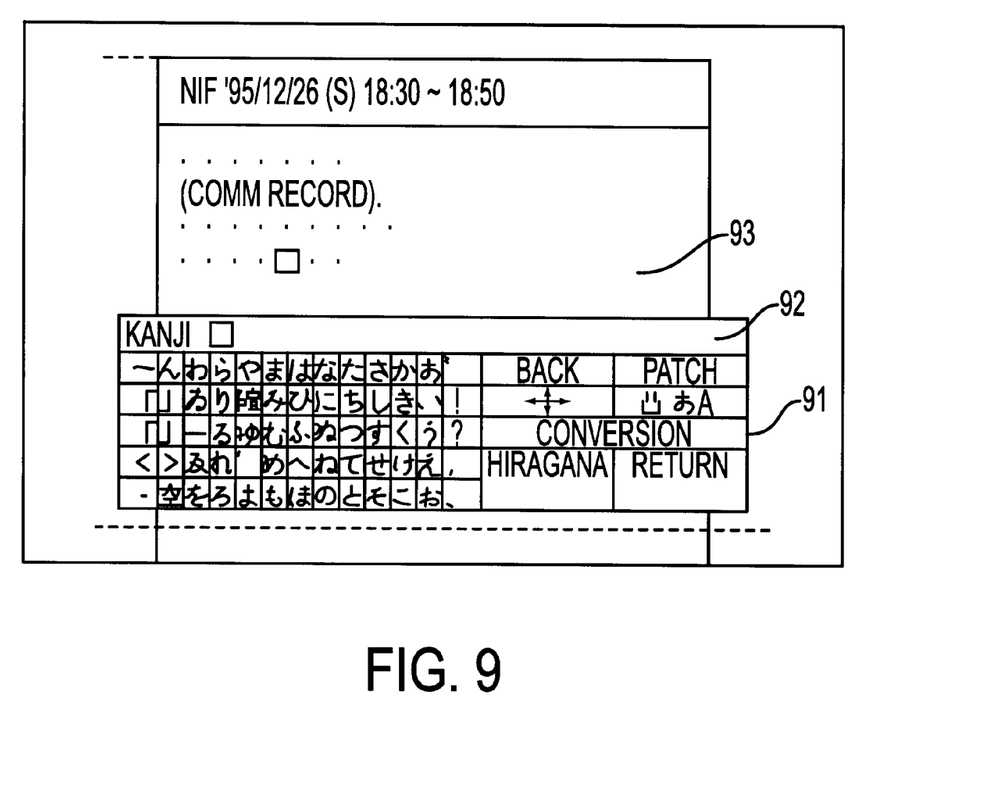
FIG. 9 is an explanatory diagram showing a character arrangement of a software keyboard.
Figure 10:
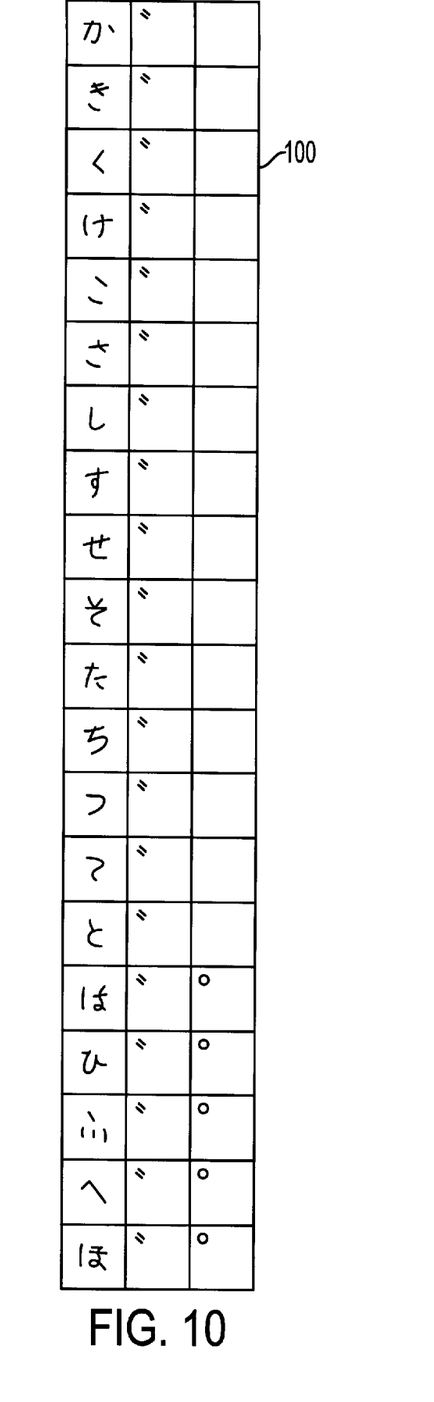
FIG. 10 is an explanatory diagram showing a continuous input admissible character table.

FIGS. 9 and 10 are explanatory diagrams showing a third preferred embodiment of the present invention. In FIG. 9, numeral 91 denotes a software keyboard (pseudo keyboard) displayed on the display screen of the CRT display 2. Display of the software keyboard 91 is controlled by a pseudo keyboard display section 15 (see FIG. 2).

In this preferred embodiment, the pseudo keyboard display section 15 stores a continuous input admissible character table 100 shown in FIG. 10. Specifically, the table 100 includes only those hiraganas (cursive kana characters) which can be sonant and/or semi-sonant characters, along with characters ('' and °) which may be inputted subsequent to those hiraganas to make them the sonant or semi-sonant characters, respectively. Hereinafter, the character ('') will be referred to as "sonant point" and the character (°) will be referred to as "semi-sonant point". The pseudo keyboard display section 15, while constantly referring to the table 100, controls the sonant or semi-sonant point, which may be inputted next, to be displayed in a flickering fashion or in an inverted fashion.

In FIG. 9, a character inputted via the software keyboard 91 is once displayed on a character string compiling line 92. When fixed, the fixed contents are reflected on an editorial picture 93.

The software keyboard 91 includes 50 hiraganas displayed in a matrix. It is arranged that an input character can be determined by moving the cursor on the matrix of hiraganas using the direction selector key 6 of the controller 5.

For example, when a hiragana (か) is inputted, the pseudo keyboard display section refers to the table 100 and displays in an inverted fashion the sonant point ('') which is a continuous input admissible character subsequent to the hiragana (か) and is located adjacent to a hiragana (が). Thus, the user recognizes that the sonant point ('') can be inputted next.

As described above, in this preferred embodiment, those characters, such as the sonant and semi-sonant points, which are continuously inputted only after the certain hiraganas, are displayed in the manner to notify the user that the continuous input is admissible, such as in the flickering or inverted fashion. Thus, wherever the sonant and semi-sonant points are arranged on the software keyboard 91, the user can easily find and input those sonant and semi-sonant points.

In FIG. 9, the semi-sonant point (°) is arranged just under a hiragana (ゆ). Although this position is not so noticeable, when one of hiraganas (は)-(ほ) is inputted, the semi-sonant point (°) is displayed in the inverted fashion so that the user can easily input the semi-sonant point (°) and thus input the corresponding one of hiraganas (ぱ)-(ぽ).

Figure 11:
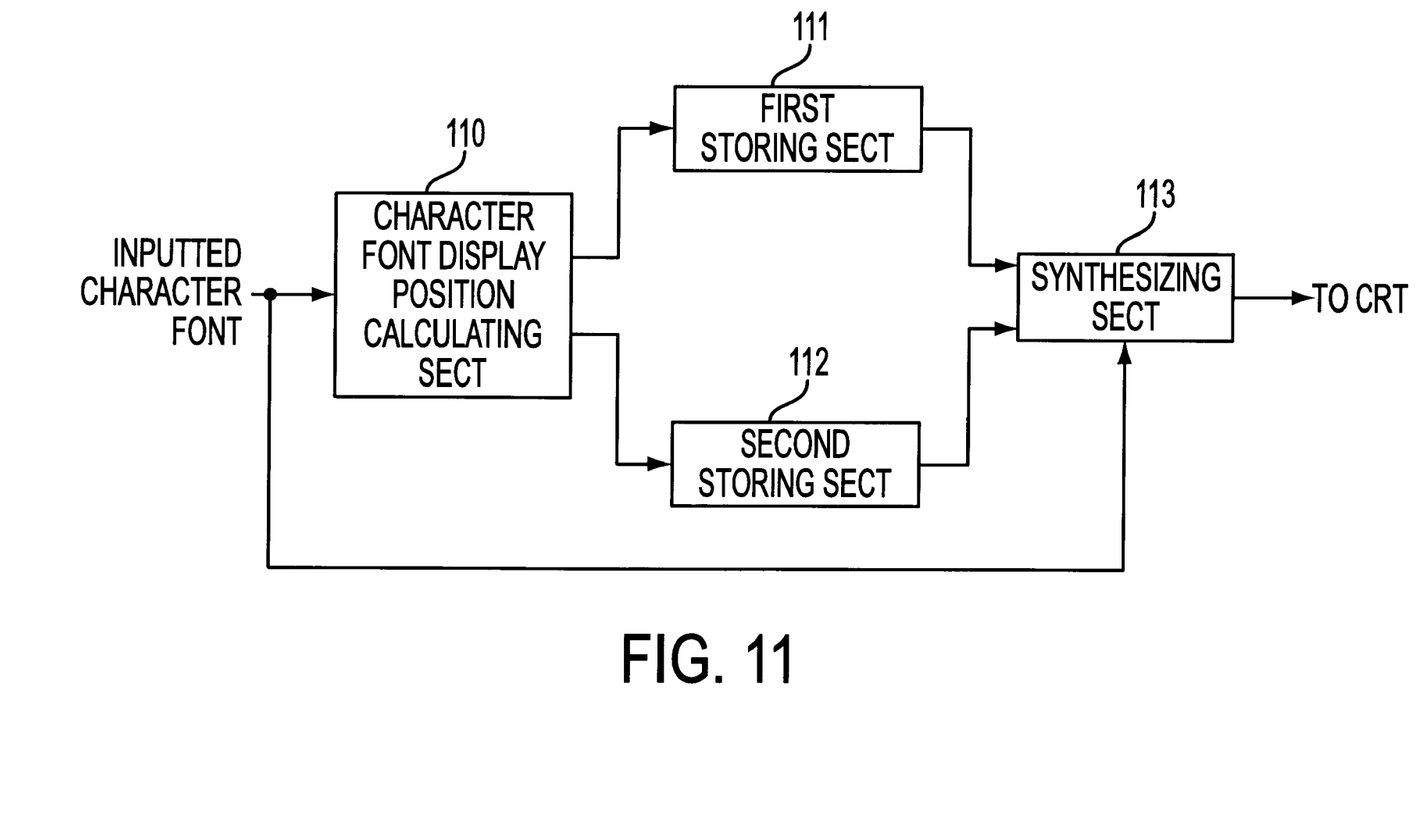
FIG. 11 is a functional block diagram for explaining a procedure for producing a character with shadow.
Figure 12:
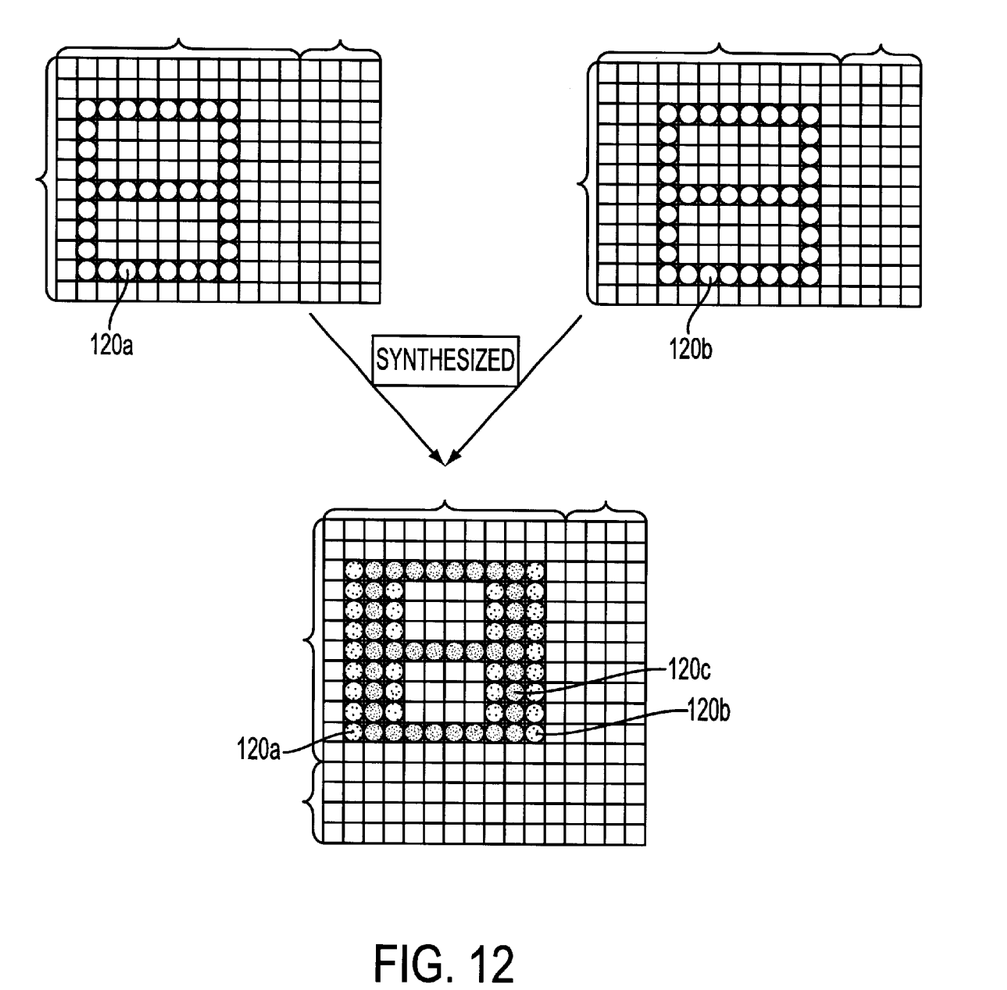
FIG. 12 is a diagram for explaining the procedure for producing the character with shadow.

FIGS. 11 and 12 are diagrams showing a technique for enhancing the recognition of the thus determined character.

Specifically, in FIG. 12, a first shadow font 120a is prepared by shifting a preset font of an inputted character 120c in a −X direction (leftward in FIG. 12) by one dot. A color of this shadow font 120a is determined so as to render the inputted character font 120c distinct, and thus determined to be gray or white when the inputted character font is, for example, black.

Subsequently, a second shadow font 120b is prepared by shifting the inputted character font 120c in a +X direction (rightward in FIG. 12) by one dot. A color of the second shadow font 120b may the same as that of the first shadow font 120a. Then, the first and second shadow fonts are synthesized, and the inputted character font is superposed on the synthesized shadow font.

The foregoing processes are executed by the display output control section 13 and shown by a functional block diagram in FIG. 11. Specifically, when the character font 120c to be displayed is determined, a character font display position calculating section 110 derives the foregoing first and second shadow fonts which are then stored in a first storing section 111 and a second storing section 112.

Subsequently, in a synthesizing section 113, the first and second shadow fonts are read out from the first and second storing sections 111 and 112 and synthesized to form the synthesized shadow fonts. Then, the inputted character font is superposed on the synthesized shadow font so that the character font for displaying is finally produced.

As described above, by arranging the inputted character font on the synthesized shadow font, the recognition of the displayed font on the display screen can be enhanced. Thus, the character information can be displayed on the display screen of the television receiver 2 without deteriorating the recognition thereof.

In the foregoing preferred embodiments, the game unit body 1 is connected to the television receiver 2. On the other hand, a personal computer having a display may be substituted therefor. Further, instead of the controller 5, an auxiliary input device, such as a mouse or a mouse pad may be used. Further, instead of the modem cartridge 3, it may be arranged that an external modem is connected to an RS-232C interface and a communication program is provided by a storage medium, such as a floppy disk or a CD-ROM.

According to the foregoing preferred embodiments, it is possible to access existing personal computer communication services using a video game unit as a terminal and a normal television receiver as a display, wherein the trouble of command inputting is reduced and the displaying manner is matched with the normal television screen.

While the present invention has been described in terms of the preferred embodiments, the invention is not to be limited thereto, but can be embodied in various ways without departing from the principle of the invention as defined in the appended claims.

What is claimed is:

1. A communication terminal for receiving character-based information from a host machine via a communication line, said communication terminal comprising:

menu identifying means for identifying menu information from a menu picture received from said host machine;

menu information storing means for extracting individual information from the menu information identified by said menu identifying means, said individual information selectable using input admissible commands from a game controller, respectively, and for temporarily storing said individual information and the corresponding input admissible commands;

display output control means for outputting at least said individual information in a manner to match a display fashion of a display unit;

selecting means for selecting one of said individual information displayed on the display unit by said display output control means; and command transmission control means for reading out the command, which corresponds to the individual information selected by said selecting means, from said menu information storing means and for transmitting a keyboard character command corresponding to the selection from the game controller.

2. The communications terminal according to claim 1, wherein said menu identifying means detects given character strings from character information forming the menu picture so as to extract said input admissible commands and said individual information.

3. A storage medium storing a communication program for receiving character-based information from a host machine via a communication line and for displaying it, said communication program controlling a computer to perform:

identifying individual information and corresponding commands from a game controller from menu information received from the host machine and storing them;

matching said individual information with a display fashion of a display unit and displaying them so as to be selectable from exterior; and transmitting the command in character form, which corresponds to the selected individual information, to the host machine.

4. A communication terminal for receiving character-based information from a host machine via a communication line, said communication terminal comprising:

a menu identifying unit identifying menu information from a menu picture received from said host machine;

a menu information storing unit extracting individual information from the menu information identified by said menu identifying unit, said individual information being selectable using input admissible commands from a game controller, respectively, and for temporarily storing said individual information and the corresponding input admissible commands;

a display output control unit outputting at least said individual information in a manner to match a display fashion of a display unit;

a selecting unit selecting one of said individual information displayed on the display unit by said display output control unit; and a command transmission control unit reading out the command, which corresponds to the individual information selected by said selecting means, from said menu information storing means and for transmitting a keyboard character command corresponding to the selection from the game controller.

5. The communications terminal according to claim 4, wherein said menu identifying unit detects given character strings from character information forming the menu picture so as to extract said input admissible commands and said individual information.

6. A storage medium storing a communication program for receiving character-based information from a host machine via a communication line and for displaying it, said communication program controlling a computer to perform:

identifying individual information and corresponding commands from a game controller from menu information received from the host machine and storing them;

matching said individual information with a display fashion of a display unit and displaying them so as to be selectable from exterior; and transmitting the command in character form, which corresponds to the selected individual information, to the host machine.

7. A method of accessing a personal computer based Internet service using a game console, comprising:

using a game controller to select a selection from a menu image received from a host;

detecting, from the received menu image, keyboard characters required to make the selection; and outputting to the host the detected keyboard characters to complete the selection.

8. A computer readable storage medium, instructing a computer to perform:

allowing a game controller to select a selection from a menu image received from a host;

detecting, from the received menu image, keyboard characters required to make the selection; and outputting to the host the detected keyboard characters to complete the selection.

9. An apparatus allowing access of a personal computer based Internet service via a game console, comprising:

a display unit displaying a menu image received from a host computer;

an input unit receiving a selection from the menu image from a game controller;

a detecting unit detecting from the menu image keyboard characters required to make the selection; and an output unit outputting to the host the detected keyboard characters.

* * * * *